United States Patent
Wright

(10) Patent No.: US 11,457,009 B2
(45) Date of Patent: Sep. 27, 2022

(54) SYSTEMS AND METHODS FOR SECURING DEVICES IN A COMPUTING ENVIRONMENT

(71) Applicant: INFILTRON HOLDINGS, INC., Warner Robins, GA (US)

(72) Inventor: Chasity Latrice Wright, Warner Robins, GA (US)

(73) Assignee: INFILTRON HOLDINGS, INC., Warner Robins, GA (US)

( * ) Notice: Subject to any disclaimer, the term of this patent is extended or adjusted under 35 U.S.C. 154(b) by 186 days.

(21) Appl. No.: 16/931,215

(22) Filed: Jul. 16, 2020

(65) Prior Publication Data
US 2021/0021592 A1 Jan. 21, 2021

Related U.S. Application Data

(60) Provisional application No. 62/875,242, filed on Jul. 17, 2019.

(51) Int. Cl.
*H04L 9/40* (2022.01)
*G06F 21/62* (2013.01)

(52) U.S. Cl.
CPC ...... *H04L 63/0861* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 2017/0339178 A1* | 11/2017 | Mahaffey | H04L 41/142 |
| 2019/0028531 A1* | 1/2019 | Nagar | G06F 16/955 |
| 2019/0130082 A1 | 5/2019 | Alameh et al. | |
| 2019/0158491 A1 | 5/2019 | Burmester et al. | |

OTHER PUBLICATIONS

Int'l Search Report and Written Opinion Appln No. PCT/US2020/042514 dated Oct. 28, 2020.
Int'l Preliminary Report on Patentability Appln No. PCT/US2020/042514 dated Jan. 27, 2022.

* cited by examiner

*Primary Examiner* — Brandon Hoffman
(74) *Attorney, Agent, or Firm* — McAndrews Held & Malloy, Ltd.

(57) ABSTRACT

Security systems and methods continuously monitor for known threats and proactively pursue information on emerging or unknown threats on devices and data. Efforts for spying, attacks from spyware, phishing, and vishing, among other threats, are used by bad actors to attack devices and data. The security systems and methods protect devices and/or data, and any associated devices and/or data, such as by anonymizing client devices and data through deconstruction and scattering data, assigning the data to one or more qubits and distributing the qubits over a blockchain. In some examples, algorithms are scanned to identify whether inputs are intended to or inadvertently targeting specific races or genders. These inputs may be used to draw particular conclusions about the individual's race, economic status, the area's economic state, etc. As such, an algorithm scanning engine protects against algorithmic biases with respect to race, gender, economic status, etc.

20 Claims, 6 Drawing Sheets

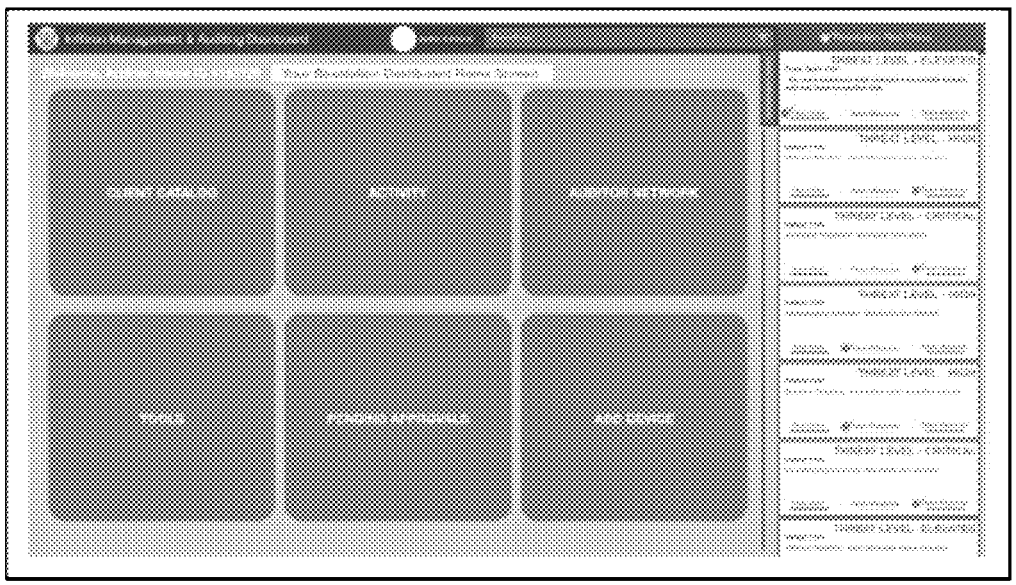

400 Auditors enter into their resolution dashboard, where they are able to have full view of all the dashboard utilities. Auditors are able to see all potential threats by alerts posted from the AI monitoring system.

FIG. 4A

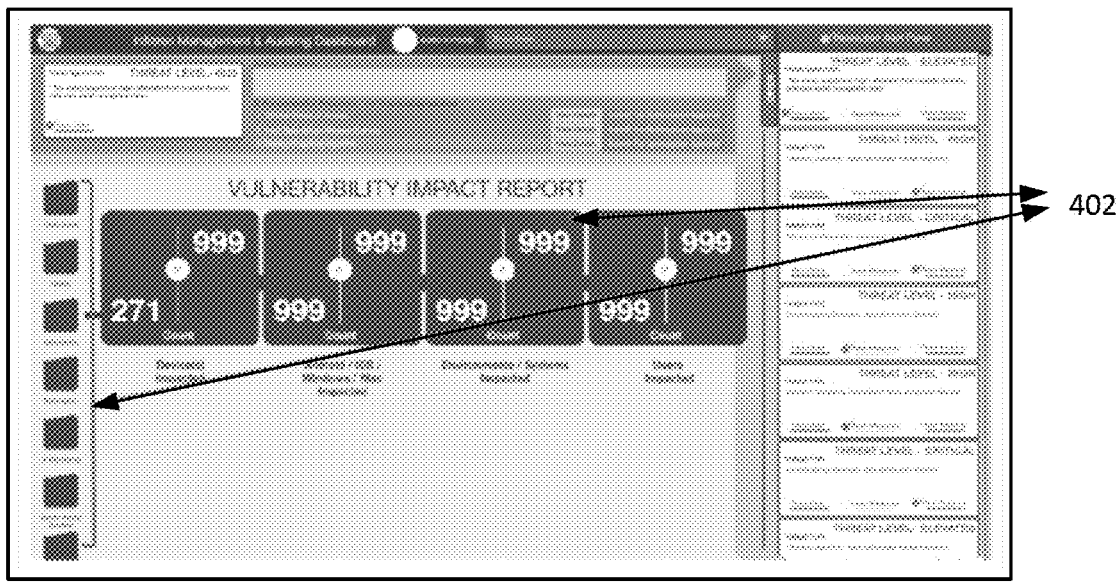

402 Once clicked and opened, auditors can see a full report on all potential impacts from multiple categories, such as: connection quality, points of vulnerability, automation to name a few.

FIG. 4B

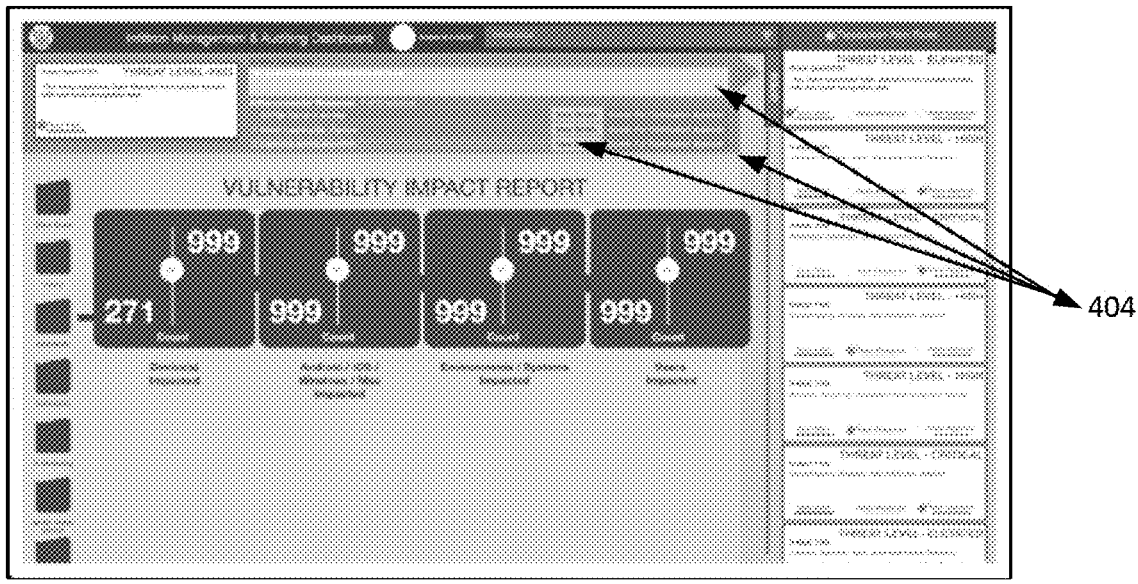

404 Auditors can place their notes as feedback for later review. While typing, the AI will generate recommended solutions to stop the threat, and auditors can click to submit for approval, which will activate vendor tools such as API's or prerequisite machine learned actions.

FIG. 4C

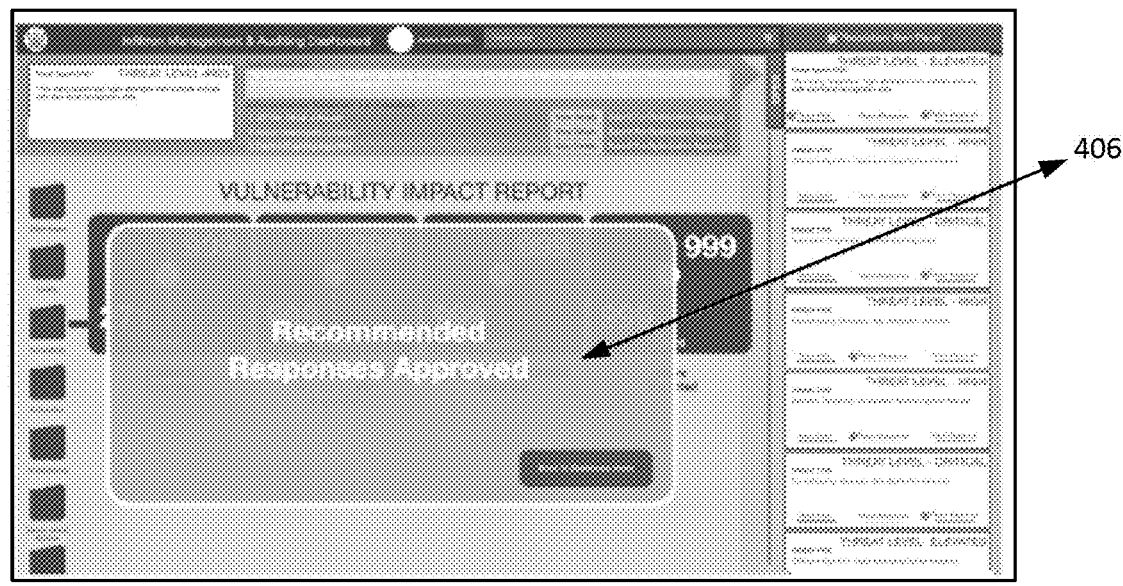

406 Once threat is stopped, the AI is now knowledgeable about the threat and which creates a new invisible barrier that protects the device from any future threats.

FIG. 4D

SYSTEMS AND METHODS FOR SECURING DEVICES IN A COMPUTING ENVIRONMENT

CROSS REFERENCE TO RELATED APPLICATIONS

This application is a Non-Provisional Patent Application that claims priority to U.S. Provisional Patent Application No. 62/875,242, entitled "Systems And Methods For Securing Devices In A Computing Environment", filed Jul. 17, 2019, the contents of which are herein incorporated by reference in their entirety.

BACKGROUND

As technology becomes more integrated in everyday life, people may have a tendency to become reliant on their devices and data (e.g., stored on devices and/or accessible online). For instance, people may store sensitive or personal information on their devices without awareness of potential risks involved with storing such information on their devices, and/or may transmit, expose, and/or otherwise grant access to third parties to their data, which exposes the devices and data to a variety of threats.

SUMMARY

Disclosed examples relates to a system for securing devices and data in a computing environment. The system includes a security system communicably coupled to a client device. The security system is configured to receive, from a user of the client device, an input corresponding to a biometric characteristic (e.g., a VoicedIn entry). The security system is configured to authenticate, using the received biometric (e.g., the VoicedIn entry), the user of the client device. The security system is configured to permit the user access to data on the client device responsive to authentication of the user via the received biometric (e.g., the VoicedIn Entry).

In some examples, the disclosed security system is configured to provide protection for computing and networked devices from threats, as well as to protect data (e.g., during transmission, from unauthorized access, analysis, etc.). In some examples, the security system creates diversion targets that attract and/or capture intrusions, bad actors, malware, and/or data breach actions, as a non-limiting list of potential threats. Having been duly attracted, the security system transports the threats to an isolated environment (e.g., a testing environment or "diversion environment"), which is physically and/or computationally separate from the device and/or data operating environments, thereby protecting the client device that may have been the target of the threat. In the diversion environment, these threats are tested and/or analyzed to determine their intended and/or possible actions upon deployment in a client environment. Based on the testing and/or analysis, the threat, results of employing the threat, and/or actions to render the threat ineffective are reported (e.g., to one or more client devices, a central repository and/or distribution platform, a user, an administrator, an authority, etc.), for additional processing and/or threat response.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 4A-4D illustrate an example dashboard for protecting devices and data in a computing environment, in accordance with aspects of this disclosure.

The figures are not necessarily to scale. Where appropriate, similar or identical reference numbers are used to refer to similar or identical components.

DETAILED DESCRIPTION

Figure 1:
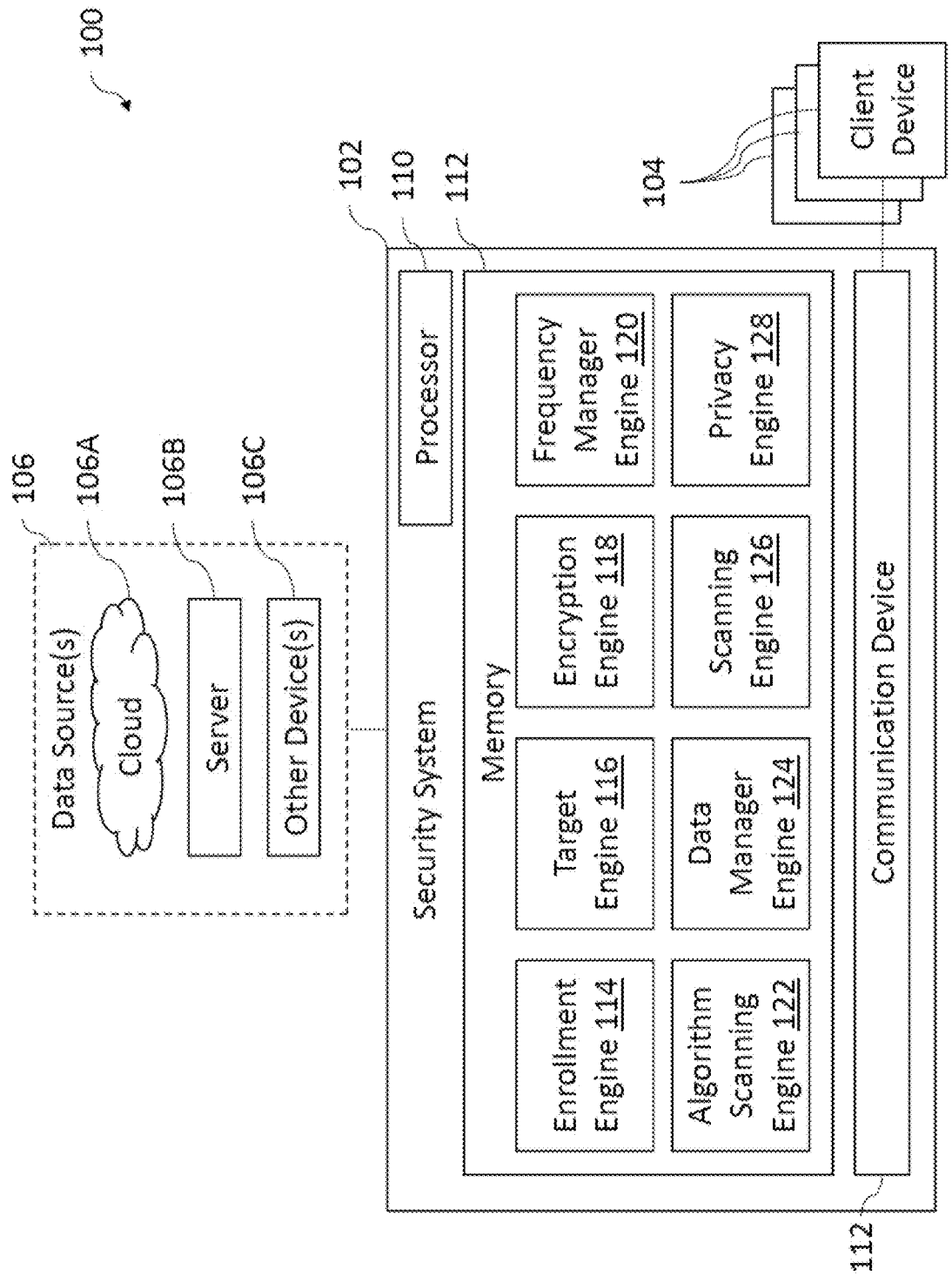
FIG. 1 is a block diagram of a system for securing devices and data in a computing environment, in accordance with aspects of this disclosure.

The list of threats to device and/or data security is vast and ever-changing. Accordingly, the disclose security systems and methods continuously monitor for known threats, as well as proactively pursue information on emerging or unknown threats (on devices and/or data). For example, efforts for spying, attacks from spyware, phishing, and vishing, among other threats, have been known to be employed by bad actors in a variety of methods. The security systems and methods actively look for signatures of such threats, and provide reporting and/or patches as needed to address those threats. The security systems and methods protect devices and/or data, and any associated devices and/or data.

Additionally or alternatively, the security systems and methods are configured to operate in the absence of a networked connection and/or a primary power source. For example, software and/or hardware can be installed on a client device, which is designed to scan the software and/or hardware of the client device to detect and/or address threats. There are particular advantages for devices that are configured for extended periods of sleep and/or passive and/or on-demand operation, such as smart speakers, device connected to the Internet of things (IoT), logistical waypoints, communications equipment, as a non-limiting list of examples. Thus, the security system may continue to provide threat detection and/or analysis even as one or more software or hardware components of the client device is not operating at full capacity. Power may be drawn from an auxiliary source (such as a back-up battery) when the device is turned off or taken offline.

The disclosed systems and methods empower people and businesses to proactively secure their data and devices in real-time. In particular, with so much data and so many devices in use (such as on active networks), an attack playground has emerged for hackers and in finding data and devices causing problems because they are traveling to different systems in the course of one day. How individuals or entities secure devices, servers, laptops, integrated platforms, or the data on devices is important, in view of advances in connectivity, such as the emergence of the IoT and 5G communications, making devices and data connected all the time and at higher speeds. Having robust protection ensures the risk of data theft is decreased, where the alternative is an unprotected, easy target for a hacker. Thus, the disclosed systems and methods is configured to prevent access to information or devices intended to cause damage to a person or organization.

The disclosed systems and methods secure data with tools that are built to protect devices and data in real-time by, for example: providing multiple factor authentication; securing data and devices regardless of connectivity; customizing solutions to meet specific and general threats to an individual, client device, and/or business system, with strategic platforms and/or dashboard integration for ease of use; and analyzing user, device, and/or data behavior to ensure compliance in various business systems, regulatory environments, etc. The disclosed systems and methods also provide data analytics to give context in supporting people and entities to solve problems facing the organization, cut cost, and foresee new innovations to improve system protection and processes.

The reality is that hackers are very savvy and go to great lengths to research personal information to get past cybersecurity defenses. Due to major data breaches to big companies and personal devices, most private information (e.g., name, social security number, phone number, email address, account numbers, passwords, etc.) has been sold on the dark web at least 25 times over.

The disclosed systems and methods also provides a solution that is socially aware to defend against racial and gender bias. IoT sensors in smart ecosystems will monitor individuals and devices and their activities in real-time. The system can inform the user of capture of socially impactful data and how that data might be used, regardless of intent.

One aspect of the disclosed security systems and methods is protection of data and/or data transmission to or from the any device. In an example, a user may initiate an action (such as a call, messaging application, web surfing, etc.) by one or more commands. For instance, the security system may recognize a voice command through one or more security features.

For example, a first security feature may encrypt the received voice command, such as by creating white noise and/or otherwise scrambling the voice and/or text during transmission. A second security feature may detect attacks on the data and/or transmission thereof (e.g., log intrusions). These and other security features may be integrated with one or more components of the client device (e.g., via an input device or other application programming interface (API), such as a keyboard, talk-to-text software, biometric scanner, etc.).

The voice command can be further analyzed to identify specific features of the client's voice and/or variations thereof (e.g., pitch, loudness, tempo, rhythm, etc.). When a voice command is received, one or more of the identified features can be used as a comparison with corresponding features of the incoming voice command to validate the command. For instance, intonation is referred to as a prosodic feature of English. This is the collective term used to describe variations in pitch, loudness, tempo, and rhythm. These features are all involved in intonation, stress, and rhythm. In examples, these feature(s) of the client's voice can be analyzed and stored during an enrollment session, which may be used for later validation processes.

In some examples, the specific feature used to validate the voice command can vary, to further complicate potential attacker's efforts.

In some examples, the frequency or other feature of the client's voice can be changed during transmission. The frequency may change over time and/or during the specific transmission to complicate attacker's efforts. The receiving system employs one or more identification techniques (e.g., using analysis and comparison tools, such as artificial intelligence (AI)) to identify and validate voice and/or other biometric data to verify an authentication request.

Another aspect of the disclosed security systems and methods is designed to anonymize client devices. This can be done by any number of techniques. For instance, data (e.g., client data, data associated with the client device, etc.) can be deconstructed and scattered, assigned to one or more bits (e.g., qubits), and/or distributed over a blockchain.

In some examples, the security system dynamically creates new security certificates and credentials; recycle any secrets stored in the Secure Notes feature, which enables users to store information such as passwords and license keys; and have end users update their passwords. This can be performed periodically or continuously, or be performed in response to occurrence of an event. In some examples, data can be distributed on a blockchain, such that no single repository has access to a complete certificate.

In some examples, the client device is anonymized by assigning each connected device a hashed identifier or address. For example, the mac address assigned to a smartphone and each accessory (e.g., Bluetooth connected headset, etc.) is hashed. When the client device makes a request to access client data, the hashed identifier is validated, providing a separate layer of protection beyond an assigned manufacturer's designation. If a client device has not been assigned a hashed identifier, data from that client device is temporarily encrypted and transferred to a diversion environment for observation and/or modifications. In some examples, the test environment will be a closed system with convex conjugate. Additionally or alternatively, device operations can be investigated in a diversion environment. In some examples, an unknown device can be observed in a diversion environment.

In some examples, data and/or transmissions lack encryption certificates and/or encryption certificates validation to access systems and/or data. The disclosed security systems and methods detect any missing encryption certificates and/or missing encryption certificate validation.

In some examples, security systems and methods are employed to identify threats and/or act to mitigate threats on one or more IoT connected devices. In an example, an agent (e.g., software and/or hardware driven, such as an Ethical Agent powered by AI) can be employed into an IoT environment to scan devices and/or data traffic. The agents can scan for threats, such as connection or attempted connection to the network and/or devices from an unauthorized source.

In some examples, IoT devices are maintained in a passive operating mode awaiting a command. This leaves open the possibility an unauthorized transmission may access the IoT device and associated data before a breach is identified (due to, e.g., data leakage from one or more IoT devices). In examples, the IoT connected devices are authorized to capture a particular type of information (e.g., a near field communication (NFC) enabled smart device to access a building, transfer information, payment, etc.; a biometric scanner; electric car charging station sensors; ultrasound sensors; etc.). The disclosed security systems and methods can scan associated sensors and identify whether the IoT connected device is employing expected (e.g., limited, authorized, etc.) techniques and connections to access data. If such a device attempts to expand data access beyond an authorized and/or recognized use, the security system will prevent such attempts, and/or route the commands and/or associated data to a diversion environment for additional processing. The security system may also scan the IoT devices for malware, dated firmware, and software.

Furthermore, the client device may be provided with software and/or hardware from the security system without a network connection, such as by a direct communication with a universal serial bus (USB) enabled device.

The security systems and methods also detects open networks and/or systems (which provide access with limited or no access restrictions). If a client device is operating on such an open system, some or all data traffic (transmitted from the client device and/or directed to the client device) may be routed to a diversion environment for additional processing. In this way, all data transmitted from the client device is encrypted and/or otherwise insulated from threats, and/or the threats are isolated from the client device itself. Transmission of commands and other data via the diversion environment allows the user to access full functionality of the client device and/or the desired network, while ensuring harmful data does not reach the client device.

In connected environments, existing and/or dedicated receivers, sensors, and/or other component(s) (e.g., hardware) can be employed to detect any type of wave or transmission (e.g., microwave pulses, lasers, ultrasound, etc.). Photonics commonly uses semiconductor-based light sources, such as light-emitting diodes (LEDs), superluminescent diodes, and lasers. Other light sources include single photon sources, fluorescent lamps, cathode ray tubes (CRTs), and plasma screens. In some examples, the origin of the signal can be identified, as well as any signature associated with the signal. Existing components can include thermal sensors, laser sensors, photodiodes, light dependent resistors (LDR), pressure sensors, current sensors, voltage sensors, power sensors, as a list of non-limiting examples.

In some examples, the security system is programmed to detect photonic filters (e.g., polarized filters, etc.), as well as the photons being filtered. Analysis of captured photons may detect the type of filter, as well as one or more characteristics of the filter based on analysis of the captured photon (e.g., the system on which it is operating, for what intended result, etc.). In some examples, the security system is configured to detect a variational circuit operating on a third party device. For instance, the security system can detect the infrastructure supporting the variational circuit, which may lead to knowledge of the presence, operation, and/or implementation of a variational circuit. The variational circuit can be programed into the security system based on the information gained during analysis of the variational circuit and/or data transmissions therefrom.

In some examples, such components may be configured to detect silicon-based systems or devices. For instance, silicon is generally used in a biosensor is a device able to detect a specific analyte by converting the recognition by a biological receptor into an electrical signal that can be further processed and related to the concentration of the analyte. Such biosensors incorporate a biological element for sensing (e.g., DNA, RNA, antibody, enzyme, etc.), a physicochemical transduction element and a readout system for signal post-processing. Depending on the transduction principle, biosensors are classified into electrochemical, mechanical, acoustic, calorimetric, optical, etc. Among these, optical biosensors offer the advantages of very high sensitivity, direct, real-time and label-free operation in addition to multiplexed capabilities. Once information has been received, it is analyzed and/or transmitted to a remote computing platform for analysis. The results may be shared with a user of a connected device and/or an administrator (e.g., in the area, with a responsibility for a particular area of interest, etc.).

In some examples, systems or devices operating in or creating an adiabatic environment are detected and evaluated. In examples, sensors may be deployed to capture and/or analyze environmental particles, to identify chemical signatures carried thereon. Additionally or alternatively, intercepted data and/or threats can be routed to a diversion environment for analysis and/or mitigation. An example of an adiabatic process is the vertical flow of air in the atmosphere; air expands and cools as it rises, and contracts and grows warmer as it descends. Adiabatic changes are usually accompanied by changes in temperature. In some examples, energy efficiency of the environment is monitored and evaluated based on characteristics (e.g., rate of air movement, pressure and/or pressure changes, temperature fluctuations, etc.) in the environment due to the adiabatic process.

Data can be protected in a variety of ways to protect against treats. In an example, the security system protects against insecure direct object reference (IDOR) vulnerabilities by implementing one or more disclosed techniques. An IDOR security flaw may be a likely target for bad actors, and which may allow an attacker to gain access to sensitive user data, such as passwords, by changing one or more values of a parameter in a request. Thus, the security system may offer to or automatically change a system password (e.g., a generic password) and then send the updated password to the end user and/or update the devices with the updated password.

In some examples, attacks and/or suspicious activity can be detected. Examples include reverse engineering commands, caller ID spoofing, and trace chat, SIM hacks, as a non-limiting list. For instance, a received command may attempt to reverse engineer a command for a password. In this example, any command that attempts to reverse a normal or expected operation would be detected. This can be achieved by a number of techniques, such as detecting disruption of data; the content of data traffic; detecting an increase in data traffic; and identifying abnormal activities on the client device in comparison to a baseline data (such as via AI monitoring), as a list of non-limiting examples. In the example of trace chat (or chat trace), encrypted and/or AI-intrusion detected data communications platform for mobile devices, across email, voice calls, conference calls, video calls and instant messenger can be vulnerable to attacks during message generation, transmission, and/or receipt of a reply. The security system is enable to detect chatbots, regular bots, and/or detect and/or block intrusions, prior to and/or during a messaging session. Additionally or alternatively, suspicious activity will be routed to a diversion environment, where a fake password can be provided to the attacker (which may be made-up, or an old password that has been changed) to bait the attacker. Once the attacker reveals itself or its intent, the actions taken can be monitored and analyzed to generate mitigation procedures.

These techniques for monitoring, analyzing, and addressing threats can be extended to reviewing short messaging service (SMS) communications, email, and/or associated links or attachments, for virus and/or malware. For example, hackers can tweak the code within a text or SMS message to target different communities by attacking particular applications (e.g., that are popular, have exhibited vulnerabilities, are linked to a user's personal or financial data, etc.). For instance, sending text messages is cheap, seemingly innocuous to the receiver, and hackers do not have to comply with and/or break into any particular platform (e.g., Apple Apps Store, the Google Play Store) to plant their code.

In some examples, a variety of types of attacks are identified, including spear phishing, elevation of authorization injections, abnormal patterns (e.g., in transmission characteristics, command requests, etc.), privilege access escalation, as a list of non-limiting examples. For instance, abnormal time delays over a period of time (e.g., days, weeks, hours, etc.) may be indicative of an attack with the intent of identifying a vulnerability in the targeted device/system (especially in automated systems). Other types of detection seek to identify lateral movement and abuse of exchange services, with the potential to block associated signals.

In some examples, an attacker may transmit data to a target device using a signal with unusual transmission characteristics to obscure the intent of the data. For example, a signal can be transmitted with higher or lower power frequencies, which may be received at the device without identifying the data (or malicious data) carried thereon. Thus, the system may employ one or more filters to block and/or identify such frequencies, which may be routed to a diversion environment for additional processing. The frequencies may originate from a variety of sources, such as communications transmission facilities (e.g., cellular towers, satellite communications, WAN/LAN, etc.). As the transmission characteristics evolve (e.g., from one generation of cellular transmission to the next), the range of frequencies and/or potential threats associated with those characteristics will be updated and provided to a user and/or administrator. In each case, the use of diversion environments may be employed to mitigate disruption, such that signals may not be completely blocked but filter, analyzed, and/or modified prior to transmission and/or receipt.

In some examples, disclosed security systems and methods detect, survey, and/or log identified multi-tier computing operations. For example, multi-tiered computing can integrate cloud computing, fog computing, and/or edge computing technologies and techniques. Such techniques can incorporate multiple devices, networked via multiple communications pathways, opening up each connected device to a variety of attacks. Multi-tier computing, including multi-tier architecture and/or multilayered architecture, is a client-server architecture type in which presentation, application processing, and/or data management functions are physically separated. For example, fog computing (e.g., fogging) is a computing architecture that employs edge devices (e.g., networked devices outside of the devices in direct communication) which may have excess computing capabilities, to carry out computation, storage, and/or communication locally. Examples include industrial controllers, switches, routers, embedded servers, and video surveillance cameras, as a list of non-limiting examples. Edge computing seeks to optimize internet devices and web applications by bringing computing closer to the source of the data. This minimizes the use of distant communications channels between client and server, which reduces latency and bandwidth usage. However, the use of such alternatives may invite attacks due to the additional network entry points and/or number of connected devices. Identification of such a network may cause the security system to respond with a number of mitigation measures, including blocking one or more signals, preventing transmission of one or more data types, and/or routing traffic through a diversion environment for additional processing.

In some examples, client data is scanned for instances of oversharing. This can be a targeted investigation, such as analyzing potential traffic or transmission patterns from data that has been given with consent (e.g., over networks), and/or by employing agents to seek out client data in various environments (e.g., social networks, the Dark Web, the Internet generally, etc.).

As used herein, "agents" may be any one or more of an AI agent, such as an AI agent defiant, and/or an AI agent detective, as a list of non-limiting examples. For instance, an AI Agent is powered by artificial intelligence to access and investigate any number of data environments. An AI agent Defiant, for example, will masquerade as a bad actor and seek out places like the Dark Web Forums and Sites; places where data is trafficked, sold, and/or distributed with malicious intent, typically for nefarious ends. The agent will bring information to the security system (e.g., a central computing platform) to update the overall solution to protect the client devices, data, etc. There may be multiple agents designed with various functions, intended for various environments, which may be created and/or modified as needed (e.g., as a new threat emerges, additional information is sought, etc.).

Agent Detective serve a similar purpose as an agent Defiant, however, the agent Detective will go to credible sources (e.g., sources that traffic in data yet are not identified as malicious), and bring information to the security system to update the overall solution. Again, multiple agents will likely be deployed.

In some examples, agents powered by AI can go "undercover" to explore the World Wide Web (WWW) to continuously scan for client data (e.g., data identified as associated with the client, such as a social security number or birthday, and/or data that has been tagged, hashed, or otherwise marked or encrypted by the disclosed security system).

In some examples, the agents may identify a signature of a particular entity (e.g., an individual, a business, etc.) that is making repeated or significant inquiries (including hacking attacks, cyberstalking, etc.) on a client device and/or client data. The inquiries may be focused on a particular individual client, type of data, and/or a particular device. Once identified, the entity may be investigated or otherwise identified, and signals originating from the particular entity can be blocked, responded to (such as with an automatic reply), and/or the entity information can be provided to the user and/or an administrator, and/or law enforcement for additional processing.

Another aspect of the disclose security systems and methods is configured to search for hidden features on client devices, on systems, and/or software (such as mobile applications). In some examples, features are hidden in order to monitor activity and/or siphon off data without detection. If such a feature is identified, and if data and/or the user's information or device have been compromised, the security system will notify the end user, an administrator, and/or the authorities (e.g., FCC, law enforcement, etc.). In some examples, a scan is performed on a new device (such as for new clients, initiating a recently activated device, etc.), including device components, logs and/or connected devices and networks (e.g., home or work Wi-Fi).

In some examples, the security system will identify other protection solutions (e.g., third party filters, antivirus software, etc.). The disclosed security system will scan the identified protection solution and record the version of firmware, software and hardware being used, and compare those versions to the most updated versions available. If an update is identified, the security system may automatically download the updated version and/or inform the user/administrator that the updated version is available.

In some examples, the security system is configured to monitor so-called "quiet frequencies." These frequencies may originate and/or be powered from long and short distances, and are typically reserved for governmental use (e.g., military, law enforcement, etc.). For example, the Q-band represents a range of frequencies contained in the microwave region of the electromagnetic spectrum. Common usage places this range between 33 and 50 GHz. The foregoing range corresponds to the recommended frequency band of operation of WR22 waveguides. These frequencies are equivalent to wavelengths between 6 mm and 9.1 mm in air/vacuum. The Q band is in the EHF range of the radio spectrum. The Q band is mainly used for satellite communications, terrestrial microwave communications and for radio astronomy studies such as the QUIET telescope. It is also used in automotive radar and in radar investigating the properties of the Earth's surface. If a signal transmitted over such quiet frequencies is received, it may be identified and routed to a diversion environment, as disclosed herein.

As provided herein, a diversion environment or testing environment is a computing environment that mimics a device or platform to receive and transmit data and/or execute software, while insulating the client device and sensitive data from threats. Diversion environments operate continuously; there may be any number of diversion environments operating at any given time. For example, a given client device may have a dedicated diversion environment, through which data is trafficked, analyzed, executed, encrypted, filtered, as a list of non-limiting functions.

Some example diversion environments are created to lure the hackers, by masquerading as a particular device, a device employed by a particular individual or entity (e.g., hospital, financial institution, governmental agency, etc.). Once inside the diversion environment, the hacker is permitted to attack the mimicked system (such as by deploying ransomware, malware, etc.), so that the hacker's information can be observed by the security system in the diversion environment. By so doing, the security system is able to monitor the hacker's information, analyze how it is employed, to what end, and/or determine what systems are to be impacted by the hacker or information stolen by the hacker. With this analysis, specific data associated with the hacker may be identified, and vulnerabilities that exist on the client device (and/or cloud computing platform, network, routers, hardware, etc.) may be identified. A patch may be generated, a filter provided, and/or a report generated for the client device, user, administrator, and/or the authorities. It may also be possible to identify the hacker and/or a unique signature associated with the hacker. Additionally or alternatively, once analyzed and/or mitigated, data from the threat can be "shredded" and disposed of. This can include returning the data back to its place of origin (if known), or it can be discarded, such as placed onto the dark web.

In some examples, a virtual machine may be used on an infected computer to hide the presence of ransomware, which may lie outside the reach of local antivirus software. For example, ransomware binary is transferred across the network to detect the presence of ransomware on the network (and/or device). By use of the diversion environment, the file is dropped on the endpoint in a simulated environment to monitor the actions of the ransomware.

In some examples, the security system prevents a device or application to access speech recognition software and/or to receive recordings from users and/or a client device, unless the user selects to allow such access.

In some examples, validation tools (such as a voiced authorization) are updated periodically (e.g., at regular intervals, at random intervals, upon receipt of a trigger, such as identification of a possible threat). The update may request another voice validation, or may use an alternative technique (entry of a password, other biometric, etc.). In some examples, when the security system has identified a particular environment in which the user is operating (e.g., such as identifying a router associated with a familiar network, such as home or work Wi-Fi), the security system compares the user's voice enrollment pattern(s) (e.g., characteristics of the user's speech) and/or environmental features (e.g., GPS location, recorded background noise, recognizing a connection to a device known to be in the environment, etc.) to validate the user.

In some examples, the security system is configured to prevent juice jacking. For example, juice jacking is an attack that involves connecting a device to a charging port that is also capable of transmitting data (e.g., over a USB). Once connected, a hacker can install a virus or malware on the device, and/or secretly copy data from the connected device (e.g., a smart phone, tablet, or other computing device). The disclosed security systems and methods will identify when an attempt is made to access data and block the access, inform the user that the request for data access has been made, and/or route the request through a diversion environment for additional processing.

In some examples, malware or other malicious content may exist on the client device and attempt to exploit data and/or functionality of the client device. In examples, the malicious payload(s) are prevented from being downloaded, either by having been identified as malware in advance (e.g., known malware, malware as identified by an agent, etc.), and/or by recognizing unusual behavior from the sender (as disclosed herein), such that the download is blocked and/or routed to a diversion environment for additional processing.

In the event that malicious payloads are downloaded and executed on the client device, the security system functions to detect the malicious data post exploitation. This can be due to unusual activity (e.g., transmitting data in the absence of a request and/or authorization from the user), and/or identification of the result of the malware as being on a list of malicious data (e.g., identified by an agent and communicated to the client device and/or user). Once identified, the security system is designed to block further execution of the malware (e.g., end processing of the affected component, end transmission of data, disconnect from the network, etc.), and/or route the malware and/or traffic to a diversion environment for additional processing.

In some examples, if a third party source attempts to access data without authorization, the security system recognizes the attempt and disables the feature (e.g., the data connection, transitions the client device to a "safe" mode, etc.). For instance, if a third party source takes a screenshot of the client device's display, a notification is provided to the user, administrator, and/or authorities, and the access is blocked, filtered, or otherwise prevented.

In some examples, the security system recognizes trends in user behavior, such that anomalous actions and/or traffic can be identified and investigated (e.g., by routing to a diversion environment). This can be implemented by historical tracking and/or application of AI tools to make connections (e.g., between trusted devices), recognize patterns (e.g., in user behavior), identify associated individuals and locations (e.g., within an organization, family, etc.). Thus, when an anomalous event occurs, the security system may evaluate the risk and determine suitable actions suitable to mitigate the risk.

In some examples, a request to perform a particular task (e.g., to access data, edit a document, etc.) is made. Upon authorization, the user and/or client device may be granted access to the platform for a limited amount of time (e.g., to begin and/or compete the task). For instance, the timeframe may change dynamically (e.g., by a random number generator, an AI module, etc.), be set for a particular task, require an update, or other layer to ensure authorized users have access needed to accomplish their particular task. Once the task is complete, the authorization for access is revoked. This may be particularly useful for enterprise clients (e.g., business, governmental bodies, etc.), who may have multiple users that may be granted access to a particular system and/or data, but wish to limit the extent of that access.

In some examples, a risk assessment may be generated for a user and/or client device. Particular activities may pose a greater risk, such that identification of such and activity would be reported to an administrator (while lower risk activities may not be). Based on the particular risk assessment, the security system may generate a solution to mitigate the risky condition, behavior, and/or environment (by reporting the solution, and/or executing the solution automatically, in accordance with user preferences). In some examples, the solution may include training, and a plan may be provided to the user (or administrator) to inform the user of the risks and provide guidance on avoiding/mitigating such risks.

In some examples, once a user has logged in and access has been validated, the security system is configured to dump logs with passwords, factor authentication, and/or other forms of logged access information immediately after login to ensure any hacker does not gain access to such information.

If an account is disabled (e.g., due to revoked credentials, timed-out access, the user violated a rule, etc.), the account may be automatically transferred to a list of accounts for periodic or continuous monitoring. Thus, if an attempt is made to access or exploit such disabled accounts, actions will be taken (e.g., block data communications, filter transmissions, route traffic through a diversion environment, etc.), and/or a report is sent to an administrator.

In some examples, listings for monitoring may be expanded to particular users, devices, and/or data. Thus, if anything on the list is accessed and/or activated, a report may be generated and/or actions taken to mitigate any risks.

The security system is further designed to identify risks associated with behavior. For example, the security system is designed to identify areas where an organization presents a vulnerability and generates an appropriate strategy for mitigation and/or training to reinforce cybersecurity behaviors needed from the end users. For instance, the system can drill down into specific violations on a client device, for a specific end user, a particular database, etc., and identify patterns in the violations, as well as build tools to address violations of that type (including preparing a cybersecurity plan).

In some examples, an audit feature can be employed for a client device or particular user (e.g., identified by a signature, login credentials, etc.). For instance, a user who requires near constant access to sensitive data may have expanded or unimpeded access to such data. The user account and/or associated client devices may be periodically or constantly scanned for behavioral trends, geographic movement, access to external data stores (e.g., third party and/or unauthorized sites), as a list of non-limiting examples. Such monitoring would happen in real-time, such that the user and/or an administrator could view activity as it occurs. Further, by monitoring the particular user/client device, the security system may identify a threat and take appropriate action, as disclosed herein.

In response to monitoring and data collection, metrics are generated to determine the effectiveness of the security program. The metrics may be a simple pass-fail (e.g., for an individual user), to sophisticated reporting (e.g., which may identify individual users, client devices, databased, networks, etc.). For instance, a sophisticated report may provide information associated with a particular action, attack, etc., and the effectiveness of the response (e.g., was the threat mitigated, was sensitive information compromised, was notification provided to the relevant authorities, were other devices, systems, users, provided learned mitigation techniques, etc.).

In some examples, the security system is configured to recognize that a user and/or client device is accessing information that requires signature on a privacy and/or consent form. Many users find such forms long, complex, and difficult to interpret. The security system is configured to scan the form, identify text of importance, and present the text in a more user-friendly way. This may include an explanation of legal terms and conditions in a more digestible format. The forms may be scanned with the aid of AI, compare language with a list, access common documents that have been previously interpreted, as a list of non-limiting examples. In some example, an AI module will be programmed to identify and enforce any regulations, laws, compliances for the relevant industry.

One component of this analysis would be directed to the user's data and the intention of the third party with regards to the sale, sharing, and/or other policies that may provide the third party access to the data. Thus, the portion of the form that allows the user to opt out or in to such access will be presented to the user for consideration.

In some examples, the client device may access information from open source and/or socially generated material. The security system is configured to scan the language, images, graphics, available metadata, etc., and compares this information to known sources (e.g., that have identified the post as false, misinformation, etc.), and/or applying an AI module to identify patterns or keywords that reveal the veracity of the post. Once identified as problematic, an alert is provided to the user as to the nature of the problem.

Accordingly, by implementing the systems and methods disclosed herein, the security system provides uninterrupted protection of devices and data by continuous monitoring, analysis, and/or mitigation of threats. This is in response to changes in client behavior, adaptability of bad actors, and/or the ubiquitous and evolving uses of devices, data, and/or networks for individuals, businesses and governments.

Advantageously, the disclosed systems and methods enable the end user to operate the device and/or access their data without impact. In other words, by use of an diversion environment, as well as continuous detection and update efforts of the AI Agents, the systems and methods protect both devices and data from potential threats, be they known, unknown, or emerging.

By operating on a separate computing platform (e.g., the employment of AI Agents, with associated analysis conducted at remote servers, and/or the use of a diversion environment for a given device and/or associated individual), known, unknown, and/or emerging threat profiles are continuously updated. Such threats are then pushed to a client device and/or a central platform (periodically and/or in response to one or more conditions being met) to provide up-to-date security as new threats and/or new mitigation techniques are identified.

As used herein, the terms "first" and "second" may be used to enumerate different components or elements of the same type, and do not necessarily imply any particular order.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

Before turning to the figure, which illustrates certain disclosed examples in detail, it should be understood that the present disclosure is not limited to the details or methodology set forth in the description or illustrated in the figure. It should also be understood that the terminology used herein is for the purpose of description only and should not be regarded as limiting.

Referring to FIG. 1, depicted is a system 100 for securing devices and data in a computing environment. The system 100 includes a security system 102, a plurality of client devices 104, and a plurality of data sources 106. The data sources 106 may be or include any device(s), component(s), application(s), and so forth, which may deliver, transmit, or otherwise provide data to a client device 104. The data sources 106 may include cloud-based data sources 106A, server based data sources 106B, and other client devices 106C. The data sources 106 may communicably coupled to the client devices 104 via a network (e.g., a Local Area Network (LAN), Wide Area Network (WAN), Wireless Local Area Network (WLAN), Metropolitan Area Network (MAN), Cellular Network (e.g., 4G, 5G, etc.), and so forth). The security system 102 may be configured to intercept outbound and inbound data for the client devices 104 via a communication device 108. In some embodiments, the security system 102 may be embodied on the client device 104. In some embodiments, each of the client devices 104 may include a separate security system 102. In still other embodiments, a group of client devices 104 may be members of a single security system 102.

The communication device 108 may be any device(s), component(s), sensor(s), antenna(s), or other element(s) designed or implemented to provide or facilitate communication between two or more devices (such as the data source(s) 106 and client device 104. In some embodiments, each of the security system 102, client device(s) 104, and data source(s) 106 may include respective communication device(s) 108 such that each of the security system 102, client device 104, and data source(s) 106 may be configured to communicate with one another.

The security system 102 may be embodied as or include a processing circuit which includes a processor 110 and memory 112. The processor 110 may be a general purpose single or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. The processor 110 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The memory 112 (e.g., memory, memory unit, storage device) may include one or more devices (e.g., RAM, ROM, EPROM, EEPROM, optical disk storage, magnetic disk storage or other magnetic storage devices, flash memory, hard disk storage, or any other medium) for storing data and/or computer code for completing or facilitating the various processes, layers and circuits described in the present disclosure. The memory 112 may be or include volatile memory or non-volatile memory, and may include database components, object code components, script components, or any other type of information structure for supporting the various activities and information structures described in the present disclosure. According to an illustrative embodiment, the memory 112 is communicably connected to the processor 110 via a processing circuit and includes computer code for executing (e.g., by the processing circuit or the processor 110) the processes described herein.

The system 100 may be deployed in various computing environments for various industries including, for instance, healthcare, finance, military or defense, avionics, quantum systems, as a listing of non-limiting examples. For example, any individual or entity who employ networked devices to traffic in data can benefit from the protections to data and devices provided by the disclosed security system. Furthermore, the system 100 may allow users of a client device 104 to operate the client device 104 "as normal," while still protecting the users from known, unknown, and/or potential or emerging threats in various computing environments.

The memory 112 may store various engines or be comprised of a system of circuits. The circuits may include hardware, memory, and/or other components configured or implemented to execute various functions. Various operations described herein can be implemented on computer systems.

The memory 112 is shown to include an enrollment engine 114. The enrollment engine 114 may be any device, component, processor, script or application designed or implemented to enroll users into the security system 102. The enrollment engine 114 may be configured to enroll users into the security system 102 by the users downloading an application on their client device 104, by launching a website associated with the security system 102, and so forth. The enrollment engine 114 may be configured to receive registration information from the user (e.g., name, address, billing information, device information, etc.).

The enrollment engine 114 may be configured to receive a VoicedIn entry from the user via their respective client device 105. The VoicedIn entry may be or include a voice or vocal prompt, a visual prompt, and so forth designed or implemented to be used for authenticating the user. The VoicedIn entry may be recorded, captured, or otherwise received from the user via their client device 104. The VoicedIn entry may be received by the user singing, speaking [low, high, fast, slow], laughing, providing conversational speech, yelling, moving the client device 104 (e.g., being used for enrollment) in circles clockwise, counter-clockwise, back and forth, and so forth. Once the VoicedIn entry is captured by the client device 104, the client device 104 may provide the VoicedIn entry to the enrollment engine 114. The enrollment engine 114 may be configured to hash the VoicedIn entry (e.g., using Blockchain, SDK, etc.).

The enrollment engine 114 may be configured to select certain portions/characteristics/aspects/etc. of the VoicedIn entry for use in authenticating the users. For instance, the enrollment engine 114 may be configured to use the pitch, frequency, cadence, stress, etc. of the VoicedIn entry, a subset of the VoicedIn entry (e.g., a subset of syllables, for instance) for comparing to subsequent recordings to authenticate the user (and thus provide the user access to various data).

While described herein as a VoicedIn entry, it is noted that other forms of inputs may be provided by the user to the client device 104 for transmitting to the enrollment engine 114. For instance, the enrollment engine 114 may be configured to receive a FaceIn input from the user by the client device 104 capturing an image of the user's face. Similarly, the enrollment engine 114 may be configured to receive a FingerprintIn input from the user by the client device 104 capturing a fingerprint scan of the user's finger(s). The enrollment engine 114 may be configured to hash the FaceIn/FingerprintIn entry and use the corresponding hash values for authenticating the user similar to the VoicedIn entry described above. In addition to a VoicedIn, FaceIn, and/or FingerprintIn input, a FootprintIn entry may also be received. For example, FootprintedIn refers to when children are born and their footprints are recorded. The security system would offer parents the option of housing this date themselves (in addition to or in the alternative encryption, as disclosed herein), and preventing governments or other entities from having access to this data (or vice versa).

The memory 112 is shown to include a target engine 116. The target engine 116 may be any device, component, processor, script or application designed or implemented to identify known or potential risks in a computing environment. The target engine 116 may be a manager of generated targets which are constructed to represent real users. The target engine 116 may manage a plurality of generated targets. Each of the generated targets may be created for drawing or capturing data intrusions, bad actors, malware, or other entities/software/programs/etc. (collectively referred to as "threats") which may implicate or breach a user's data. Each of the targets may transport the threats to a safe, diversion or testing environment (e.g., within the target engine 116 or external to the security system 102) to analyze the type of action the threat would execute (e.g., access financial data, offload confidential files, copy emails or text messages, etc.). The target engine 116 may be designed or implemented to generate a report describing each action of threats identified and corresponding to the managed targets.

The memory 112 is shown to include an encryption engine 118. The encryption engine 118 may be any device, component, processor, script or application designed or implemented to encrypt various data. The encryption engine 118 may be configured to encrypt data using various encryption protocols. The encryption engine 118 may be configured to encrypt talk-to-text features (e.g., on a native keyboard or function of the client device 104, or on third-party keyboards or functions of the client device 104). The encryption engine 118 may be configured to encrypt the talk-to-text features by creating, generating, providing, or otherwise introducing white noise during transmission of talk (e.g., voice inputs by a user). The encryption engine 118 may be configured to encrypt the talk-to-text features by scrambling, mixing, or otherwise encoding the text (e.g., using an artificial intelligence engine). The encryption engine 118 may be configured to detect advertisement (e.g., ad) log intrusions.

The encryption engine 118 may be configured to encrypt, encode, or otherwise hash Addresses associated with client devices 104. In some embodiments, the encryption engine 118 may be configured to hash Bluetooth mac addresses, IP addresses, or other addresses associated with each of the client devices 104 associated with an enrolled user. The encryption engine 118 may be configured to assign, modify, or otherwise replace the manufacturer information with the generated hash(es) throughout ownership of the client device 104 (e.g., unless the client device 104 changes ownership or the client device 104 is destroyed). The encryption engine 118 may be configured to detect missing encryption certificates and missing encryption certificate validation. As such, the encryption engine 118 may be configured to generally monitor for proper encryption certificates for data, devices, or other aspects of the system 100.

The memory 112 is shown to include a frequency manager engine 120. The frequency manager engine 120 may be any device, component, processor, script or application designed or implemented to detect, control, output, modify, or otherwise manage frequencies corresponding to a client device 104. The frequency manager engine 120 may be configured to manage frequencies in real-time (e.g., as the client device 104 is moved from location to location). The frequency manager engine 120 may be configured to detect specific frequencies (e.g., signals in the environment having the specific frequencies). For instance, the frequency manager engine 120 may be configured to detect "quiet frequencies" that use power from longer distances. The frequency manager engine 120 may be configured to detect if higher or lower power frequencies are being used to "trick" (e.g., simulate or impersonate a non-harmful frequency or a signal having a frequency typically used from a non-harmful source) the client device 104.

The frequency manager engine 120 may be configured to detect and block harmful 5G frequencies without interrupting service. The frequency manager engine 120 may be configured to modify, adjust, or otherwise change the frequency of a voice transmission (e.g., from the user to the client device 104, from the client device 104 to the security system 102, etc.) to generate a modified frequency signal. A corresponding frequency manager engine (e.g., on a different device or component) can use the modified frequency signal for re-adjusting the frequency (e.g., an inverse of the adjustment by the frequency manager engine 120) and authenticate the user.

The memory 112 is shown to include an algorithm scanning engine 122. The algorithm scanning engine 122 may be any device, component, processor, script or application designed or implemented to monitor, adjust, change, identify, or otherwise scan algorithms used by other devices. The algorithm scanning engine 122 may be configured to scan algorithms as a manner of validating the algorithms, determining a viability or deficiency of the algorithms, etc. In some embodiments, the algorithm scanning engine 122 may be configured to scan algorithms used to identify person(s). The algorithm scanning engine 122 may be configured to scan algorithms to identify whether the algorithms use inputs that are intended to or inadvertently target specific races, genders, etc. The algorithm scanning engine 122 may be configured to scan algorithms to identify whether the algorithms use inputs corresponding to expunged records, arrest without guilty verdicts attached, and racial inequality implications. As such, the algorithm scanning engine 122 may be configured to protect against algorithmic biases with respect to race, gender, etc. In some embodiments, the algorithm scanning engine 122 may be configured to detect a genderless voice, face, iris, and other artificial biometric data, which may be used as an input to an algorithm for identifying a person, or which may be used as an input for authenticating a person.

In some examples, the algorithm scanning engine 122 may be configured to identify if a social media application was detecting and/or altering biometric data of a user (e.g., from a photograph, video or voice recording, fingerprint scan, iris scan, other biometric, etc.). For instance, algorithms may capture markers on the user's facial image, which, although distorted or otherwise modified, retain the markers, which can be identified by the algorithms.

In some examples, the algorithm scanning engine 122 may be configured to detect if particular characteristics or markers of a user (e.g., social, physical, behavioral, etc.) are being used by a third party to build a dossier on that individual (e.g., a digital social engineering). Such a dossier may be sold to parties interested in exploiting the user's persona or data.

The memory 112 is shown to include a data manager engine 124. The data manager engine 124 may be any device, component, processor, script or application designed or implemented to manage data rights, access, privileges, or other aspects of data. The data manager engine 124 may be configured to block native speech recognition software from receiving any recordings of registered users (e.g., on their client device 104 or on other client devices 104). The data manager engine 124 may block the speech recognition software from receiving recordings unless a registered option selects an option or modifies a setting, which permits sharing of recordings to the speech recognition software.

The data manager engine 124 may be configured to monitor, identify, detect, or otherwise check for oversharing of data from a client device 104 across systems that contact the client device 104. The data manager engine 124 may be configured to create threat models per client device 104, data, network, etc. For example, threat models will be unique to each client device, data, incident, entity, and/or user. This is because each are different, provide different function, are exposed to different threats, and/or may be accessible to different users and/or networks, which necessarily presents different threats to the various systems, devices, data, and/or users.

The data manager engine 124 may be configured to read third-party privacy documents for websites, apps, interfaced hardware, etc. The data manager engine 124 may be configured to extract, condense, or otherwise break down the third-party privacy documents for the user prior to the user accepting the privacy agreement presented in such documents.

The data manager engine 124 may be configured to maintain the VoicedIn entry at the client device 104 such that the VoicedIn entries are secure. The data manager engine 124 may be configured to determine the main environments in which the client devices 104 typically located (e.g., car, home, bedroom, work, etc.). The data manager engine 124 may be configured to maintain an environment list corresponding to the environments (e.g., using Wi-Fi or other network access point information corresponding to the environments). The data manager engine 124 may be configured to request an update to the VoicedIn entries (e.g., at a frequency of time, such as every half hour/hour/daily/etc.). Based on the environment and the VoicedIn entries, the data manager engine 124 may be configured to authenticate the user.

The data manager engine 124 may be configured to detect mis-informational news, posts, website verbiage, etc. by parsing such content and comparing the parsed content with other content. The data manager engine 124 may be configured to detect IoT sensor data leakage.

The memory 112 is shown to include a scanning engine 126. The scanning engine 126 may be any device, component, processor, script or application designed or implemented to scan one or more devices, components, elements, and so forth which may be communicably coupled to or otherwise within range of a client device 104. The scanning engine 126 may be configured to scan IoT sensors (Ex. Smart Cities, Electric Car charging station sensors, Ultrasound sensors, sensors used to scan biometrics) for malware, dated firmware, and software.

The scanning engine 126 may be configured to extract power with designated Ethical Agents from malware ridden IoT sensors. The scanning engine 126 may be configured to search for hidden features on devices (e.g., client devices 104), in systems, and software. To the extent that a hidden feature compromises an end users privacy, the scanning engine 126 may be configured to notify the end user and the FCC. The scanning engine 126 may be configured to detect (and notify end users) of unknown or surreptitious device connectivity (e.g., to a client device 104 or to a network to which a client device 104 is connected). The scanning engine 126 may be configured to scan browsers and apps [IP/URL] for malware. The scanning engine 126 may be configured to detect spying, spyware, phishing, and vishing.

The memory 112 is shown to include a privacy engine 128. The privacy engine 128 may be any device, component, processor, script or application designed or implemented to manage, handle, or otherwise process data access rights or other privacy rights for a client device 104. The privacy engine 128 may be configured to defend against insecure direct object reference (IDOR) vulnerabilities. IDOR vulnerabilities include a type of security flaw that is easy to exploit by permitting an attacker to gain access to other users' accounts simply by changing the value of a parameter in a request. The privacy engine 128 may be configured to offer (or automatically change) system generic passwords and send the passwords to the end user and/or update the user's client devices 104 with the password. The privacy engine 128 may be configured to detect reverse engineering and commands for guessing or determining an end users' password(s) by hackers.

The privacy engine 128 may be configured to read privacy policies associated with applications or other third parties collecting data (e.g., to determine what type of data is being collected, how often the data is being collected, what is being done with the data, where is the data being stored, who owns and has rights to the data, etc.). The privacy engine 128 may be configured to give the user option to opt in or out of the application(s) according to this information. The privacy engine 128 may be configured to provide a report fraud option.

In some embodiments, the privacy engine 128 may be configured to detect or identify siren server(s). A siren server may be or include a computer, group of computers, or other computing devices collectively arranged on a network. A siren server may be characterized by narcissism, hyperamplified risk aversion, and extreme information asymmetry. Siren servers may gather data or other information from the network to which they are connected—often times without paying for the data. The data may be intercepted and analyzed by the siren servers without having any rights to the data. The privacy engine 128 may be configured to detect siren servers connected to a network. The privacy engine 128 may be configured to restrict or block the detected siren server's access to data on the network.

The privacy engine 128 may be configured to detect Caller ID spoofing. The privacy engine 128 may be configured to implement a trace chat or a chat trace functionality. Such a functionality may be configured for encrypted/AI-intrusion detected communications platform for mobile devices, across email, voice calls, conference calls, video calls and instant messenger. The privacy engine 128 may be configured to detect chatbots, regular bots, and detect/block intrusions pre/during chat or messaging sessions. The privacy engine 128 may be configured to detect (and generate a notification corresponding to) screenshots by outside sources.

The privacy engine 128 may be configured to protect against SIM hacks. The privacy engine 128 may be configured to review text and email (e.g., at a client device 104) for links with virus or malware. The privacy engine 128 may be configured to block interception of SMS messages. For instance, intercepting SMS messages is possible because of vulnerabilities in a set of telephony signaling protocols referred to by a common name—SS7 (aka Signaling System 7, aka Common Channel Signaling System 7). The privacy engine 128 may be configured to identify potential threats that may attempt to expose such vulnerabilities, and prohibit such threats from intercepting SMS messages from the client device 104.

Figure 2:
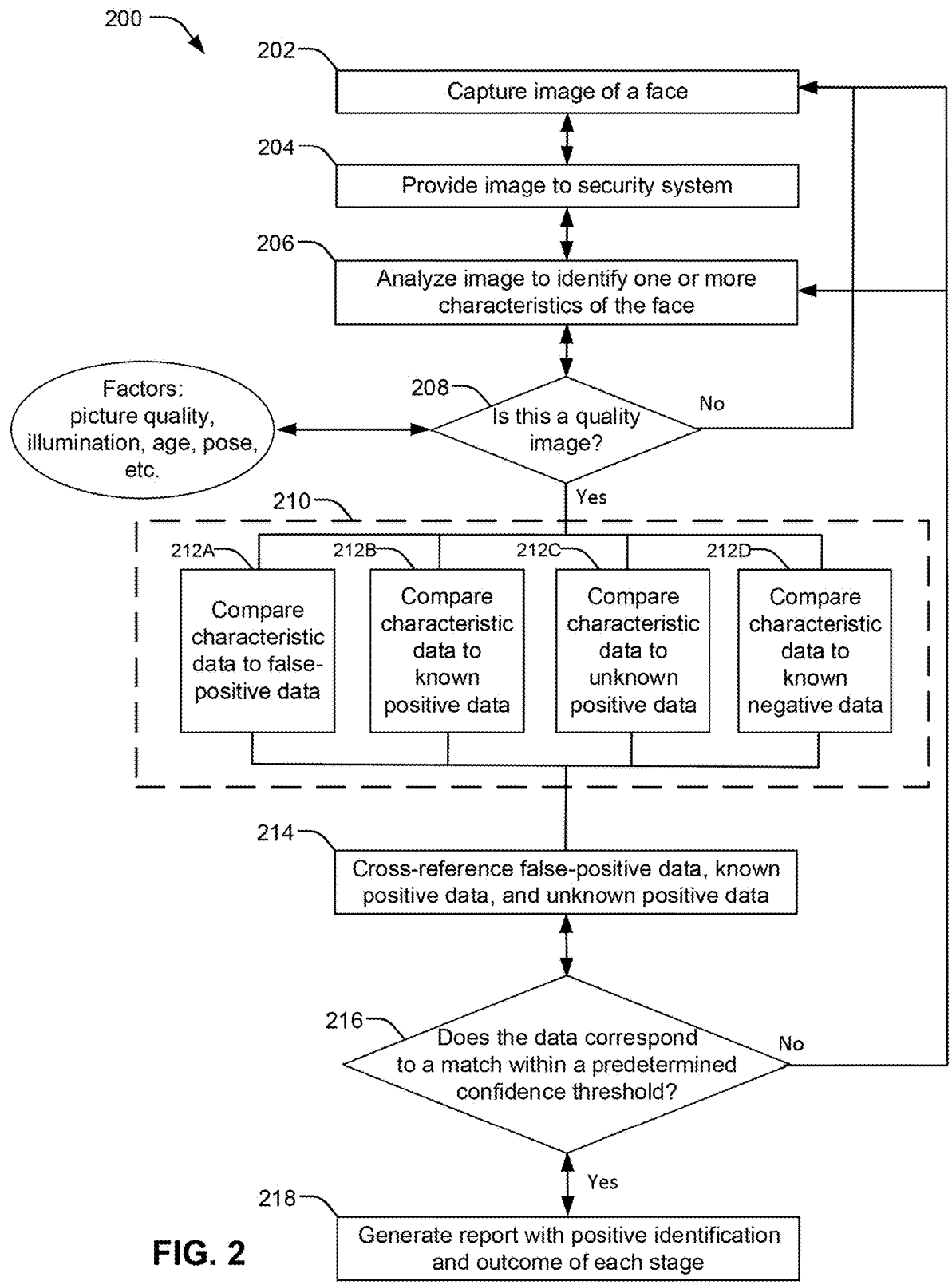
FIG. 2 provides a flowchart representative of example machine-readable instructions that may be executed by the example security system of FIG. 1 to implement facial recognition processes, in accordance with aspects of this disclosure.

FIG. 2 provides a flowchart representative of example machine-readable instructions 200 that may be executed by the example security system 102 of FIG. 1 to implement facial recognition processes, in accordance with aspects of this disclosure. The example instructions 200 may be stored in the memory 112 and/or one or more of the data sources 106, and executed by the processor(s) 110 of the security system 102. The example instructions 200 are described below with reference to the systems of FIG. 1. In particular, the method represents computer software or hardware for gathering and managing human biometric data; downloadable mobile applications for gathering and managing human biometric data; software for the authentication and verification of a human based on physiological characteristics, namely, racial and gender characteristics, for the purpose of controlling digital and physical access to a secure network.

As disclosed herein, the security system 102 (via the algorithm scanning engine 122) scans algorithms to identify whether the algorithms use inputs which are intended to or are inadvertently targeting specific races, genders, etc. These inputs can include personal attributes (e.g., skin, eye and hair color or type, body shape, etc.), environmental features (e.g., clothing, geographic location, ambient noise, speech patterns, colloquialisms, etc.), and/or government or public records (e.g., expunged records, arrest without guilty verdicts attached, and racial and/or gender inequality implications) and may be used to draw particular conclusions, such as the monitored individual's race, economic status, the area's economic state, etc. As such, the algorithm scanning engine 122 may be configured to protect against algorithmic biases with respect to race, gender, economic status, etc.

With respect to law enforcement's employment of facial recognition, for example, the security system may be used to correct and/or update records. For instance, the security system ensures expunged records, arrests without guilty verdicts, etc., are properly removed from an individual's profile. In addition, racial and/or gender equality implications may be mitigated by use of AI model.

In some examples, the algorithm scanning engine 122 (e.g., software and/or hardware, such as a secure FPGA configured to implement the algorithm scan) can be integrated into a system that collects, transmits, stores, and/or otherwise processes the inputs for the algorithm. This may include a server, a processor, a transmission component (e.g., a router, a cellular tower, a satellite, etc.), such that the algorithm scanning engine 122 may identify implementation of such an algorithm and provide the information to an administrator, the authorities, and/or automatically modify the algorithm's behavior.

In block 202, an image of a face is captured, by a camera, display, from an application, etc. The image is provided to the security system (e.g., as an input for analysis) in block 204. In block 206, the image is analyzed by the security system to determine one or more characteristics of the imaged face. The characteristics may correspond to one or more structural features (e.g., shape, contour, size, arrangement, etc.) as well as aesthetic features (e.g., color, tones, etc.). In block 208, the security system applies a number of factors (such as picture quality, illumination, age, pose, etc.) to determine if the image is of a sufficient quality to make an identification. If the image quality is insufficient, the method returns to block 202 to re-capture the image.

If the image quality is of sufficient quality, the method proceeds to block 210 to compare the characteristics to one or more databases. For example, the characteristics are compared to false-positive data in block 212A; to known positive data in block 212B; to unknown positive data in block 212C; and/or to known negative data in block 212D. The results of the comparisons are then cross-referenced in block 214. At block 216, the security system determines if the characteristic data is a match with any of the databases. For example, a particular confidence threshold must be exceeded in order to make a positive identification. If the confidence threshold is not achieved, the method returns to block 202 to re-capture the image. If the confidence threshold is exceeded, a positive identification report is generated in block 218. For example, the report may include details from each of the database comparisons, which may include factors that contributed to the positive identification. In some examples, a report can be generated even when a positive identification is not achieved, the details of the comparison being reported to inform an administrator as to why no identification was achieved.

Figure 3A:
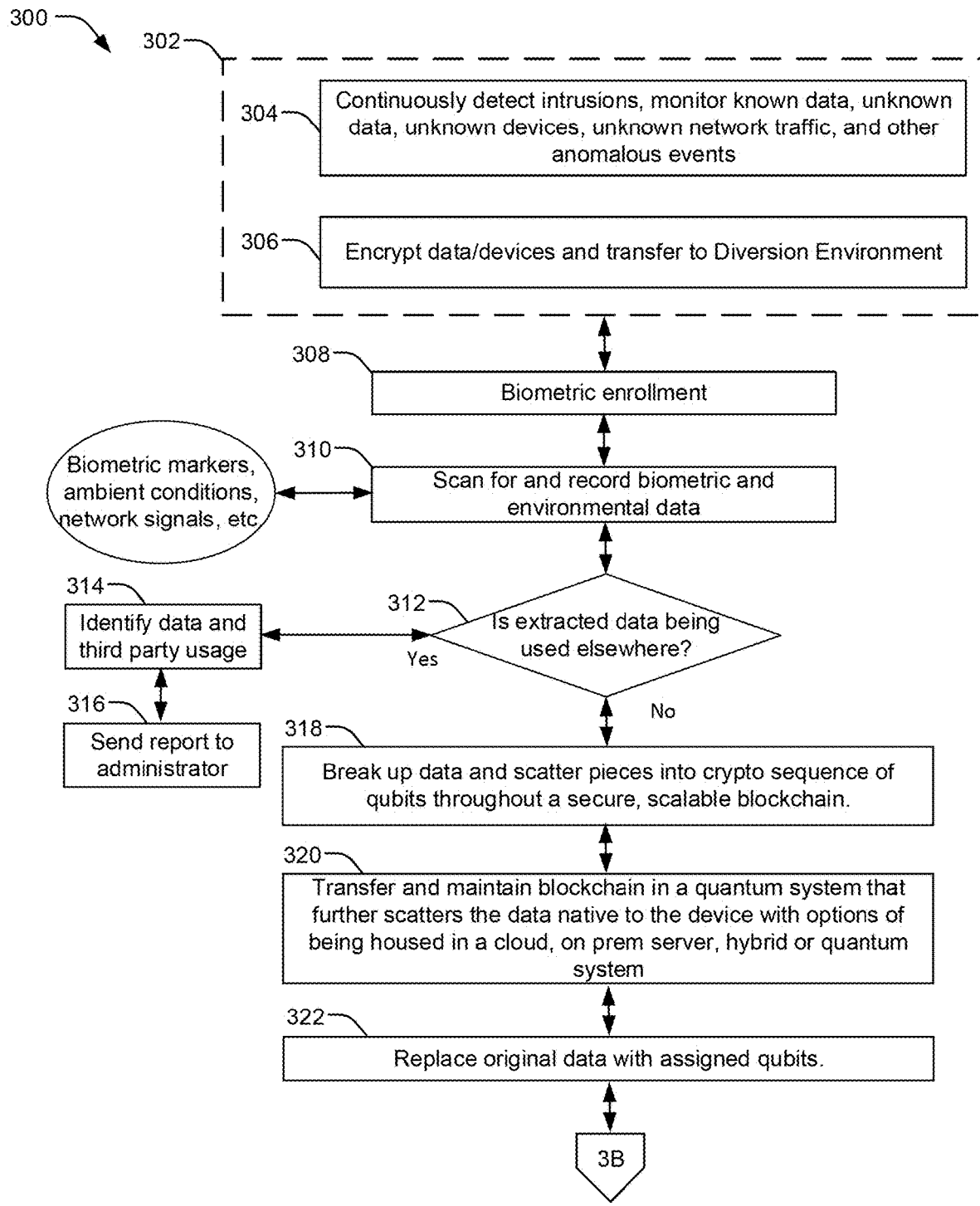
FIGS. 3A and 3B provide a flowchart representative of example machine-readable instructions that may be executed by the example security system of FIG. 1 to implement data protection and authentication, in accordance with aspects of this disclosure.
Figure 3B:
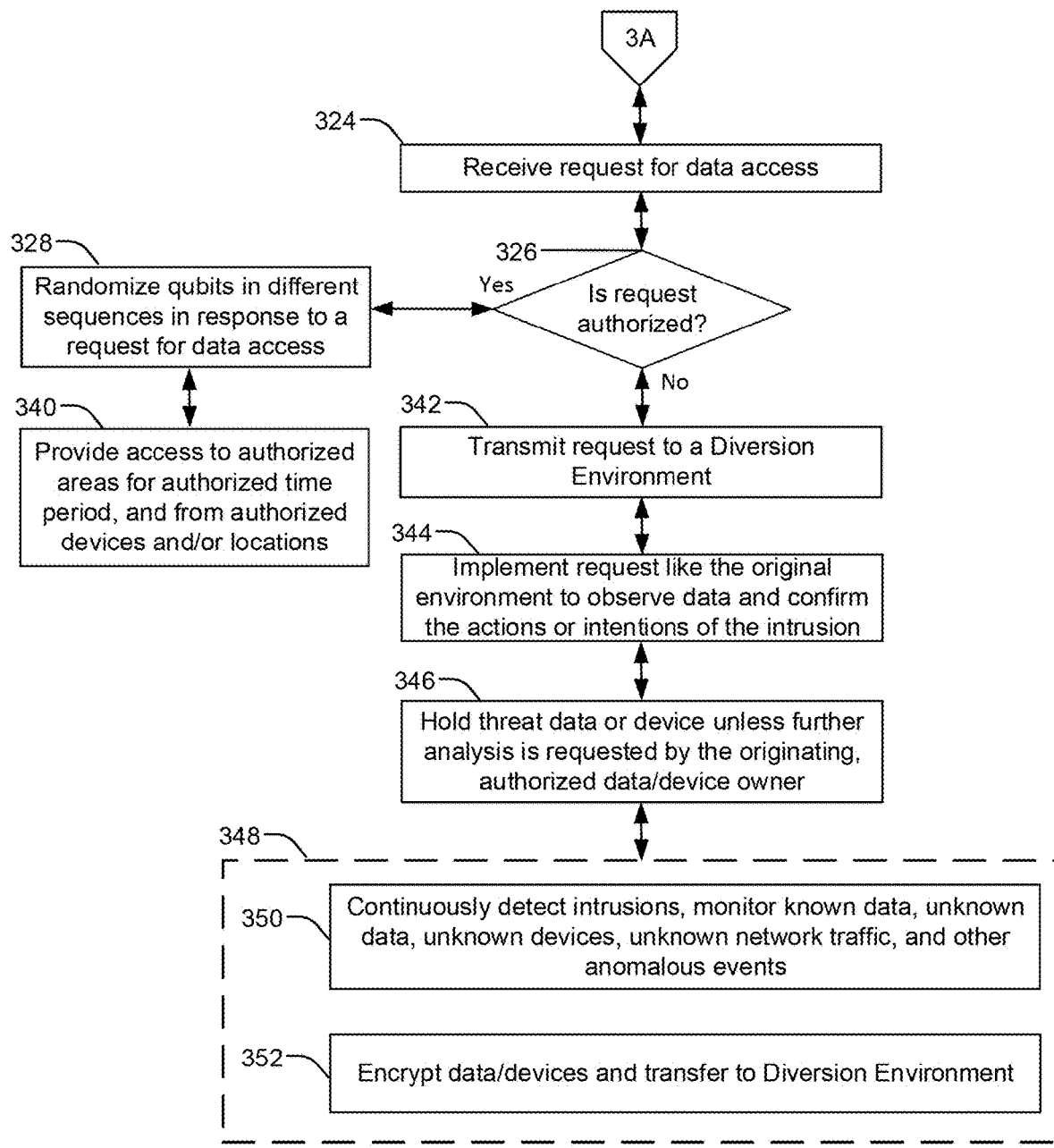

FIGS. 3A and 3B provide a flowchart representative of example machine-readable instructions 300, which may be executed by the example security system 102 of FIG. 1, to implement data protection and authentication. The example instructions 300 may be stored in the memory 112 and/or one or more of the data sources 106, and executed by the processor(s) 110 of the security system 102. The example instructions 300 are described below with reference to the systems of FIG. 1. In some examples, the instructions 300 are executed in a quantum computing environment, and/or are configured to provide protection from threats generated from, associated with, transmitted by, and/or stored on a quantum computing platform.

Block 302 represents ongoing actions, which are executed continuously during each step, in particular, the security system is configured to continuously monitor threats, detect intrusions, scan for known data, unknown data, device, network traffic, and/or any known or unknown anomalous events, as shown in block 304. In block 306, identified threats are encrypted and/or transferred to a diversion environment for additional processing. As disclosed herein, the continuous monitoring actions are not limited to any particular process and/or component; the disclosed systems and methods are continually employed to identify threats and/or provide solutions.

In an example, if a user desires to access a protected client device and/or data, the user provide biometric data (or other validation data) to enroll for system access in block 308. In block 310, the security system is configured to scan for both the biometric data (e.g., markers), as well as other data that may exist in the environment (e.g., ambient conditions, network signals, etc.). At block 312, data extracted during enrollment is compared against one or more sources (e.g., lists, databases, etc.) to determine if the data is being used for purposes other than those intended by the data owner. If the data is in use elsewhere, the data and the third party usage is identified in block 314. At block 316, a report is provided to the user and/or an administrator detailing the third party usage.

If data use by a third party is not detected, in block 318 the security system breaks up the data and scatters the pieces into a crypto sequence of qubits. In some examples, this is achieved by distributing the qubits throughout a secure, scalable blockchain. In some examples, the data can be assigned a hash to replace the original data. These modifications can be maintained throughout ownership of the data (e.g., until a password expires, a device is replaced, etc.). Examples of data may be personal data, passwords, device identifiers (ISN, mac address, etc.), and location and time data, as a list of non-limiting examples.

In some examples, the data on the blockchain is transferred to and/or maintained in a quantum system in block 320. This serves to further scatter the data native to the device, such as with options to store the data in a cloud environment, on a server, and/or in a hybrid or quantum storage or transmission system. In some examples, the original data is replaced in block 322, such as with one or more of the qubits.

Continuing to FIG. 3B, once the data has been protected, the security system may receive a request for data access from a user in block 324. In block 326, the security system determines whether the request is authorized. For example, if the request is authorized (e.g., the requester has provided the proper credentials), the data qubits are randomized in different sequences in block 328. In block 340, the access to the authorized data is provided, such as for a limited amount of time (and/or subject to updated authentication requests during access). For example, some people working remotely on privately owned devices create a huge vulnerability to threats. The disclosed security system is configured to enroll the device, for instance, by scanning the device and data (including frequientyl connected devices and/or networks) to build a threat model for the device/data. The device/data may then be evaluated, threates identified (including out-of-date software/firmware), the threat model/assessment provided to an administrator, as well as mitigation actions implemented (be it automatically or guidance provided to the administrator).

If the request is not authorized, the method proceeds to block 342, where the request and associated data are routed to a diversion environment. In block 344, the request and associated data are implemented in the diversion environment, which is configured to mimic the environment of the intended target. Thus, the data can be observed in a testing environment that is separate from the client device, thereby adding another layer of protection from possible threats. Data and/or devices (including known and unknown devices) associated with the unauthorized request is then maintained in the diversion environment unless further analysis is requested by the authorized data/device owner in block 346.

As provided in block 348, implemented continuously before, during, and after this or any process, the security system continues to monitor threats, detect intrusions, scan for known data, unknown data, device, network traffic, and/or any known or unknown anomalous events, as shown in block 350, and identified threats are encrypted and/or transferred to a diversion environment for additional processing in block 352. In some examples, once the data and/or device is provided to the diversion environment, the data and/or device is stripped of encryption. This may allow the data and/or device to mimic normal operation in the diversion environment, while the transmitted data and/or device remains protected from threats during communication.

FIGS. 4A-4D illustrate an example dashboard for protecting devices and data in a computing environment. As shown in FIG. 4A, a dashboard is provided that presents a view to a user or administrator, which may provide information on devices and/or data protected by the security system. As shown in block 400, an auditor/user/administrator enters into a resolution dashboard, where they are able to have full view of all the dashboard utilities. The auditor(s) are able to see a listing of potential threats by alerts posted from the AI monitoring system. As shown in FIG. 4B and detailed in 402, Once clicked and opened, auditors can see a full report on all potential impacts from multiple categories, such as: connection quality, points of vulnerability, automation to name a few.

As shown in FIG. 4C and detailed in 404, Auditors can place their notes as feedback for later review. While typing, the AI will generate recommended solutions to stop the threat, and auditors can click to submit for approval, which will activate vendor tools such as API's or prerequisite machine learned actions. As shown in FIG. 4D and detailed in 406, Auditors can place their notes as feedback for later review. While typing, the AI will generate recommended solutions to stop the threat, and auditors can click to submit for approval, which will activate vendor tools such as API's or prerequisite machine learned actions.

In some examples, data is generated, analyzed, stored, and/or communicated via quantum computers or by the employment of quantum systems. Quantum systems follow unique principles of physics, which allow for some computation to be executed more quickly, and/or with different characteristics, than classical computing platforms.

In some examples, quantum systems present unique detection issues. The disclosed security system may be configured to identify systems employing quantum processing techniques and/or hardware. Quantum computers cannot perform functions that are not theoretically computable by classical computers, i.e. they do not alter the Church-Turing thesis. They could, however, be able to do many things much more quickly and efficiently than classical computers.

In some examples, the security system runs a topology discovery scan that is basic to quantum systems and other types of systems stated. For instance, after the security system completes a scan of the device (or network, etc.), the system automatically constructs a system architecture diagram showing all connected devices, IP addresses on the network, and other parameter information (e.g., energy usage, an estimate of energy usage over time, potential other devices that may seek to connect to an identified device, etc.).

In examples, trapped ion quantum computing systems and devices can be detected; such as when a client device operates as a quantum system, and an external quantum system attempts to access the client device. Further, protection for data from a quantum system must be transmit, transact, execute, etc. In some examples, end user behavior can be determined by analysis of traffic and access logs using quantum mechanics In some examples, the security system detects superconducting architectures, such as by running parameterized circuits on a trapped ion quantum computer and feeding the results to a classical optimizer. Particle Swarm and/or Bayesian optimization may be employed, which reveals convergence of the quantum circuit to the target distribution, both of which depend on the quantum hardware and classical optimization strategy. In some examples, the security system detects external superpositions.

In order to detect quantum operators, the detection devices may implement (quantum) short coherence time and limited circuit depth. For example, randomized quantum gates are used to secure data on the security system. Different angle degrees will be used to ensure variations can be unique. In some examples, sensitive data (e.g., client data) is stored in a quantum system until it is uninstalled. The use of quantum computing architecture provides an added layer of security.

When a hacker or malicious/anomalous event is detected and captured, its data is destroyed by an irreversible transformation process. In other words, by changing the state of the data, the data is destroyed because it cannot go back to its previous state. Once this process is complete, the altered data is dumped from the system forever or, if discovered, back to its origin.

In some examples, the security system is designed to detect data with reversible states and, if it is causing a vulnerability within the operational architecture or a client's device, destroy the data by changing the state.

In some examples, by use of one or more sensors, a physical scan can reveal information regarding a full body quantum (e.g., information and/or images associated with 4D, 5D, 3D capture). For instance, current airport security employs a machine that puffs air to detect chemicals (e.g., narcotics etc.). In some examples, a scan can identify a 3D printer image/object intended to mimic a biological feature (e.g., an eye, fingerprint, etc.) to trick a biometric recognition software or hardware technology.

In some examples, the security system is configured to operate in complex environments, providing monitoring, detection, analysis, and reporting functions as disclosed herein. For instance, the security system can be implemented in a "Smart City" environment, where multiple sensors are arranged throughout the city, continuously monitoring the environment, collecting and analyzing data to improve municipal functions and safety. In this and other examples (e.g., healthcare environments) sensors monitor for changes in the environment (e.g., rapid changes in temperature, moisture, particulate matter, including disease, vectors, and contaminants, etc.), and can generate alerts which may include guidance on mitigating the identified threat.

In some examples, the sensors detect a thermal state of the environment, including associated with the sensors or other critical infrastructure. For instance, a bridge may display extreme stress by superheated joint, or a machine in a factory setting show signs of wear by excess heat.

In a healthcare setting, sensors may gauge the exposure of equipment or personnel to harmful radiation, chemicals, etc.

In some examples, sensors are used to detect chemical signatures of multiple types. For instance DNA, artificial DNA, and altered DNA may be captured and analyzed, such as by employing contactless technology (e.g., due to risk of exposure), to include tasks like drawing blood, taking X-rays, etc.

In some examples, the security system is used to detect animals, plants, and insect, including identifying the current cycle in the relevant lifespan. Further, the security system can determine if the organism is natural, simulated, genetically modified, lab grown, etc., which may be used to provide insight data regarding growth of the organism, growth of offspring growth, etc.

In some examples, the security system can improve Identification Friend or Foe (IFF) abilities to identify objects, signals, data, people, and other thing identified by an IFF system. As described herein, IFF is an identification system designed for command and control. It enables military and civilian air traffic control interrogation systems to identify aircraft, vehicles or forces as friendly and to determine their bearing and range from the interrogator. For instance, monitoring and analysis of IFF detected items can be done discreetly, typically undetectable within a given range (e.g., 100 miles from a point of interest, such as an airport, a military installation, etc.). The security system can employ AI models to identify equipment, insignia, transmission protocols, biometric features (e.g., languages spoken, accents, etc.) of approaching personnel or items, to build an IFF risk assessment.

In some examples, the security system may be integrated with a hardware attachment (e.g., for a 5G communications tower) that serves to reduce human health risk. The associated device may be mounted on the tower to detect frequencies in the operating environment and report if they exceed predetermined threshold levels. In some examples, the communications system (or a client device with transmission capabilities) may be provided with software and/or hardware from the security system without a network connection, such as by a direct communication with a universal serial bus (USB) enabled device.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) and can provide various functionality for server system and client computing system, including any of the functionality described herein as being performed by a server or client, or other functionality associated with message management services.

It will be appreciated that the systems described herein are illustrative and that variations and modifications are possible. Computer systems used in connection with embodiments of the present disclosure can have other capabilities not specifically described here. Further, while the systems are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a supply with a program or other code that, when being loaded and executed, controls the supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The processor may identify conditions of a given process or action and automatically find the optimum value of one or more parameters for the identified conditions. An example processor implementation may be a microcontroller, a field programmable logic circuit and/or any other control or logic circuit capable of executing instructions that executes control software. The processor could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A security system for securing devices and data in a computing environment, the security system communicably coupled to a client device and configured to:
   receive a request for access to protected client data from a user of the client device;
   authenticate the user of the client device using a biometric data marker associated with the client device;
   determine if the user has authorization to access the protected client data;
   in response to a determination that the user does not have authorization to access the protected client data, transfer the data associated with the request to a diversion environment for additional processing without detection from the user, wherein the diversion environment is physically or computationally isolated from the client device;
   alter the data in the diversion environment during processing; allow the altered data to return back to an origin of the data; and continue to monitor activity of the altered data.

2. The security system of claim 1, the security system further comprising an enrollment engine configured to:
   enroll the client device or the user into the security system; and
   transfer data associated with the client device or the user to be hosted in the diversion environment.

3. The security system of claim 1, wherein, in response to a determination that the user does not have authorization to access the protected client data, the security system is further configured to:

generate changes to one or more system parameters associated with the client device; and transmit the changes to the client device.

4. The security system of claim 3, wherein, in response to a determination that the user does not have authorization to access the protected client data, the security system is further configured to:

generate a fake password;

transmit the fake password to a source of a threat; and in response to the source of the threat employing the fake password, divert data or transmissions from the source of the threat to the diversion environment or block the data or transmissions from source.

5. The security system of claim 1, wherein determining if the user has authorization to access the protected client data further comprises:

receiving, via an input device, a biometric characteristic corresponding to the user;

comparing, via a processor, the received biometric characteristic with a list of authorized biometric characteristics; and if the received biometric characteristic matches a biometric characteristic on the list of authorized biometric characteristics, authenticating the user and authorizing user access, wherein the determining is performed periodically, continuously, or in response to a command.

6. The security system of claim 1, if the request to access the protected client data is authorized, the security system further configured to provide access to the data for a limited amount of time.

7. The security system of claim 6, further configured to:

determine if the access to the protected client data is for purposes intended by an owner of the data; and if the protected client data is being used for purposes intended by the owner of the data, break up the data and scatter data pieces into a crypto sequence of qubits.

8. The security system of claim 7, further configured to distribute the data pieces throughout a blockchain, wherein the blockchain is transferred to or maintained in a quantum system.

9. The security system of claim 7, further configured to:

generate an updated authentication request during the limited amount of time; and route the data to the diversion environment if the updated authentication request fails.

10. The security system of claim 1, further configured to replace the protected client data with a hash identifier.

11. The security system of claim 1, wherein the client device is connected to one or more internet of things (IoT) enabled devices, the client device or the IoT enabled devices having set operational or access limits.

12. The security system of claim 1, the security system further configured to:

identify data or transmissions associated with attempts to access the client device or the IoT enabled devices or channels or attempts of the client device or the IoT enabled devices to access another device or network beyond the set operational or access limits; and block data or transmissions associated with the attempts or transfer the data or transmissions to the diversion environment.

13. The security system of claim 1, the security system is further configured to:

monitor frequencies of transmissions carrying data to the client device;

compare the frequencies to a listing of expected frequencies; and in response to the received transmission outside of the expected frequencies, route the transmissions or data associated with the transmissions to the diversion environment for filtering, analysis, or modification.

14. A security system for securing devices and data in a computing environment, the security system communicably coupled to a client device and configured to:

monitor data associated with the client device and data transmitted to and from the client device for threats to the client device;

identify a threat to the client device based on the data;

transfer the data associated with the client device or the transmitted data to a diversion environment for additional processing in response to identifying the threat, wherein the diversion environment is physically or computationally isolated from the client device;

identify a source of the threat;

shred the data associated with the threat such that the data is irreversibly transformed;

return the shredded data associated with the threat to its place of origin; and continue to monitor activity of the shredded data.

15. The security system of claim 14, wherein the diversion environment is configured to analyze or execute the data separate from the client device.

16. The security system of claim 14, wherein the diversion environment is configured to operationally mimic the client device, such that transmission of commands and traffic are routed through the diversion environment to facilitate full functionality of the client device.

17. The security system of claim 14, further configured to encrypt data routed to or from the diversion environment.

18. The security system of claim 14, further configured to:

access a database comprising a listing of threats, wherein the threats include code, software, or an unauthorized request;

compare the data associated with the client device or the transmitted data to the listing of threats; and identify the threat to the client device by matching the data to a threat in the listing of threats.

19. The security system of claim 18, further configured to:

track one or more of connections, patterns, users, or locations of actions or traffic associated with an authorized user of the client device;

compare the data associated with the client device or the transmitted data to the tracked actions or traffic associated with the authorized user of the client device;

determine the data associated with the client device or the transmitted data as anomalous in response to the data failing to match the tracked actions or traffic;

destroy data associated with the threat by an irreversible transformation process by changing the state of the data; and record identified threats on the database.

20. The security system of claim 14, wherein the threats comprise software or commands including one or more of an intrusion, a bad actor, malware, or data breach actions, and wherein the data associated with the client device and the data transmitted to and from the client device comprises one or more of personal data, passwords, device identifiers, location, time data, or a combination thereof.

* * * * *